T. A. LINN.
RESILIENT SUSPENSION WHEEL.
APPLICATION FILED APR. 22, 1915.
1,203,213.
Patented Oct. 31, 1916.
2 SHEETS—SHEET 1.
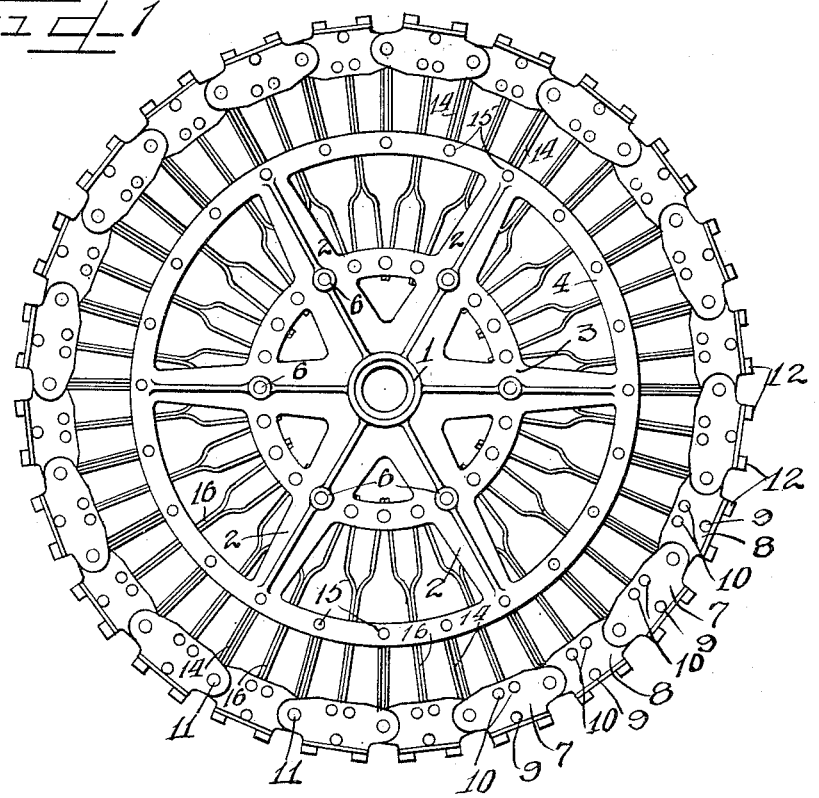
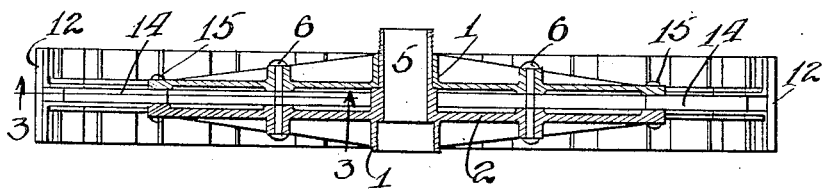
Witnesses
J. W. Angell
Inventor
Theodore A. Linn
Charles W. Hills
Atty.

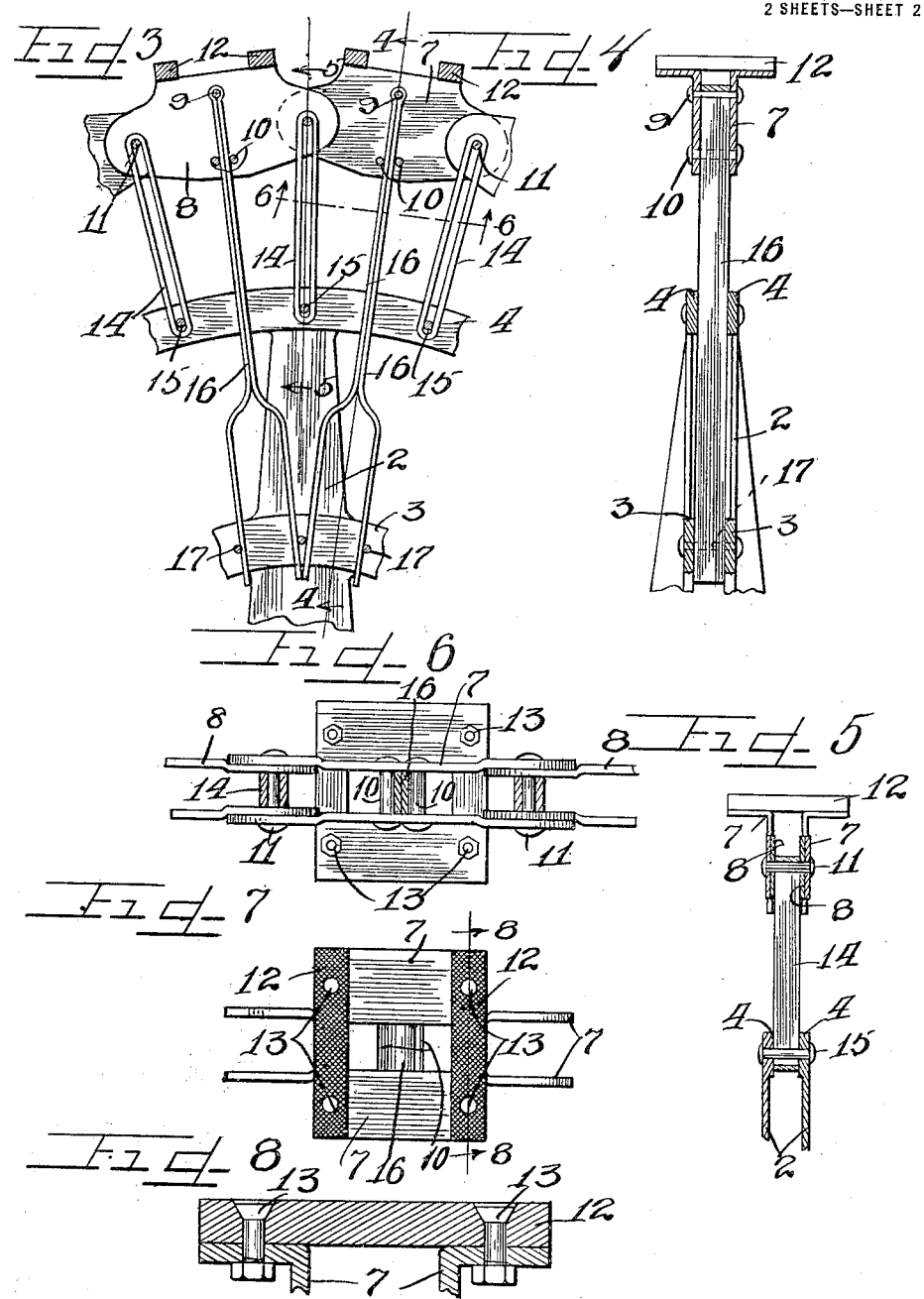

UNITED STATES PATENT OFFICE.

THEODORE A. LINN, OF CHICAGO, ILLINOIS.

RESILIENT SUSPENSION-WHEEL.

1,203,213.　　　　　Specification of Letters Patent.　　Patented Oct. 31, 1916.

Application filed April 22, 1915. Serial No. 23,107.

*To all whom it may concern:*

Be it known that I, THEODORE A. LINN, a citizen of the United States, and a resident of the city of Chicago, in the county of Cook and State of Illinois, have invented certain new and useful Improvements in Resilient Suspension-Wheels; and I do hereby declare that the following is a full, clear, and exact description of the same, reference being had to the accompanying drawings, and to the numerals of reference marked thereon, which form a part of this specification.

A great many types of resilient wheels have been constructed, but in general they have proved objectionable, owing to the fact that in practically all types of such wheels the load upon the axle is transmitted as a compressive stress through those resilient members intermediate the axle and the point of contact of the tread with the road, the other resilient members around the wheel remaining, to all intents and purposes, inert. Where the load is thus confined as a compressive stress to only few of the resilient members, the distortion or compression thereof is considerable and as a consequence the recoil action is very great.

This invention, however, relates to an improved type of resilient wheel wherein the load upon the axle is suspended by non-resilient tension members or straps from around the upper tread portion of the wheel, the tread of the wheel being capable of distortion in traveling over an uneven road to avoid transmission of the shocks which would otherwise be created, to the hub or axle of the wheel, and with strong frictional resilient means acting independently of the suspension means to resist deflection or distortion of the tread of the wheel.

It is an object therefore of this invention to construct a resilient wheel having a flexible tread or rim with mechanisms acting to resist deflection or distortion thereof, and with means suspending the axle load of the wheel from said tread independently of the mechanisms which resist deflection of the tread.

It is also an object of this invention to construct a resilient wheel comprising a flexible tread with a relatively large hub spider suspended therefrom at a plurality of points and with means movably associated with said hub spider and connected to elements of the tread to resist deflection of the tread independently of the operation of the suspension mechanisms for the spider.

It is also an object of this invention to construct a resilient wheel embracing a flexible tread and a relatively large hub spider with suspension straps between the elements of the tread and said hub spider whereby the hub spider is supported along that portion of the tread opposite the point of contact with the road or other point of application of resistance applied to the tread of the wheel.

It is furthermore an important object of this invention to construct an improved type of resilient wheel wherein the hub and axle are suspended by non-extensible means from a link tread built up of a number of pivotally connected elements, and with mechanisms associated with said elements and with the hub of the wheel to resist deflection of the tread of the wheel.

It is finally an object of this invention to construct an improved type of resilient wheel acting efficiently by deformation on the tread portion thereof, to obviate transmission of shocks to the hub or axle of the wheel.

The invention (in a preferred form) is illustrated in the drawings and hereinafter more fully described.

In the drawings: Figure 1 is a side elevation of a wheel embodying the principles of my invention. Fig. 2 is a central horizontal section taken therethrough. Fig. 3 is a fragmentary enlarged detail taken on line 3—3 of Fig. 2. Fig. 4 is a sectional detail view taken on line 4—4 of Fig. 3. Fig. 5 is a similar detail section taken on line 5—5 of Fig. 3. Fig. 6 is a detail sectional view taken on line 6—6 of Fig. 3. Fig. 7 is an exterior plan view of the mechanism shown in Fig. 6. Fig. 8 is a detail section taken on line 8—8 of Fig. 7.

As shown in the drawings: The axle carrying member or spider of the wheel consists of two members, each having a hub denoted by the reference numeral 1, and radiating therefrom, a plurality of arms or spokes 2, formed integral therewith. Integral with said arms is an inner ring 3, and an outer ring 4, the aforesaid two members being duplicates of one another and disposed one on each side of the wheel. As clearly shown in Fig. 2, the hub 1, of one of the members is extended inwardly through that of the other, and is denoted by the reference numeral 5. Said respective members forming the wheel spider are rigidly connected to one another by bolts 6, extending through the arms 2, thereof.

The tread of the wheel is made up of a plurality of links 7 and 8, pivotally connected to one another, and each of said links, as clearly shown in Figs. 4 and 5, consists of two parts flanged outwardly along their upper margins and connected to one another by pins or rivets 9 and 10, respectively. Said links 7 and 8, are pivotally connected to one another by means of pins 11, as clearly shown in Fig. 6, and the links 7, are bent outwardly at their ends and the links 8, bent inwardly at their ends to permit the links 7, to overlap the links 8, in the manner clearly shown in Fig. 6. Secured across the flanged portions of each of the links 7 and 8, are corrugated metal tread members 12, which, as clearly shown in Figs. 6, 7, and 8, are retained upon the flanged portions of the links by means of counter-sunk bolts 13.

The link tread of the wheel is connected to the spider members in the following manner: Metal straps, denoted as a whole by the reference numeral 14, are engaged around the pivot pins 11, of the links 7 and 8, and also around the pins 15, provided between the outer rings 4, of the spider member, so that the spider member is thus normally suspended by said straps from the upper portion of the tread of the wheel. In order to resist inward deflection of the thread, fork shaped resilient bars 16, are engaged around the pins 9, of each of the links, and between the pins 10, thereof, and extend radially inwardly with the forked ends of said bars confined between pins 17, extending between the respective rings 3, of the spider member. The inner ends of adjacent fork members 16, as clearly shown in Fig. 3, abut one another to resist inward movement of each other. Under ordinary normal conditions, when no load is carried by the wheel, the stiffness of the resilient fork bars 16, will be sufficient to maintain the tread impelled outwardly from the spider members, and with the parts in this position it will be seen, by reference to Fig. 3, that the straps 14, are not drawn tightly between the respective pins 11 and 15, but that a slight gap or space exists between the pins 15, and the end of the straps.

The operation is as follows: The tread of the wheel, being made up of a number of links, is flexible and may yieldingly conform to inequalities of the road, so that shocks which would otherwise be imparted to the wheel are not transmitted to the hub or axle thereof. The resilient fork bars 16, act to resist deformation or deflection of the tread, while on the other hand the straps 14, act to hold the spider member in which the load is journaled suspended from the upper portion of the link tread. As a consequence, it is obvious that considerable deflection or deformation of the tread at the point of contact thereof with the ground may take place, and the straps 14, along that portion of the tread which is deflected, will merely slide inwardly over the pins 15, of the spider member. Due to the flexibility and pivotal connections of the respective straps 14 and bars 16, and the gap between the ends of the straps 14 and pins 15, it is obvious that a vertical displacement of the horizontally disposed members of the wheel due to deformation of the lower tread portion upon encountering an obstruction or bump in the road, may readily take place.

I am aware that various details of construction may be varied through a wide range without departing from the principles of this invention, and I therefore do not purpose limiting the patent granted otherwise than necessitated by the prior art.

I claim as my invention:

1. In a wheel of the class described a rigid hub member, a link tread, straps pivotally connected to said link tread and hub member to suspend the hub member from the upper portion of the wheel, and radially disposed resilient bars secured to said tread and slidably engaging said hub member to resist deformation of the tread.

2. In a wheel of the class described a flexible link tread, hub spiders rigidly secured to one another, slidable strap members connecting said spiders to said tread to suspend the spiders from the upper portion of the wheel when in use, and radially disposed resilient bars secured to the links of the tread and slidably engaging between said hub spiders to resist deflection of the links of the tread.

3. In a device of the class described a flexible tread comprising a plurality of pivotally connected links, hub members rigidly connected to one another, straps connecting said hub members to said links to suspend said hub members from the upper portion of the tread when the wheel is in use and limit outward movement of the tread from said hub members, a plurality of pins secured transversely between said hub members, and radially disposed forked bars secured to each link of the tread with the forked ends of the bars engaging between the pins on the hub members to resist inward movement of the links by deflection of the tread.

4. In a device of the class described a tread comprising a plurality of pivotally connected links, pins secured transversely in each of said links, resilient fork bars engaged to said links by said pins, rigidly connected hub members, pins secured transversely therein to receive the forked ends of said bars therebetween to resist inward deflection of the links of the tread, and means sustaining the hub members and the load carried thereby from the upper portion of the tread.

5. In a wheel of the class described the combination with a flexible tread, of rigid hub members connected to one another, means having sliding relation with the hub members and with each other resisting deformation of said tread, and mechanism acting under tension to sustain the hub members in proper relation with the tread.

6. In a wheel of the class described a flexible tread, rigid hub members, means acting under tension slidably connected between said tread and hub members to sustain the hub members in proper position from the upper portion of the wheel, and radially disposed resilient forked members associated with the tread and slidably engaging the hub members to resist deflection of said tread inwardly toward said hub members, the inner ends of adjacent forked members abutting one another to resist inward movement of each other.

7. In a wheel of the class described a hub, a flexible link tread, and abutting forked resilient means therebetween to resist deformation of the tread and inward movement of each other.

In testimony whereof I have hereunto subscribed my name in the presence of two subscribing witnesses.

THEODORE A. LINN.

Witnesses:
CHARLES W. HILLS, Jr.,
GEORGE R. MOORE.

Copies of this patent may be obtained for five cents each, by addressing the "Commissioner of Patents, Washington, D. C."